US008829879B2

(12) United States Patent
Latham, II et al.

(10) Patent No.: US 8,829,879 B2
(45) Date of Patent: Sep. 9, 2014

(54) INDUCTOR CURRENT MEASUREMENT FOR DC TO DC CONVERTERS

(75) Inventors: Paul Walker Latham, II, Lee, NH (US); Mansur Kiadeh, Cupertino, CA (US); Stewart Gall Kenly, Epping, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 198 days.

(21) Appl. No.: 13/447,742

(22) Filed: Apr. 16, 2012

(65) Prior Publication Data

US 2012/0194161 A1 Aug. 2, 2012

Related U.S. Application Data

(63) Continuation-in-part of application No. 12/959,456, filed on Dec. 3, 2010, now Pat. No. 8,159,205.

(51) Int. Cl.
*H02M 3/156* (2006.01)
*H02M 1/00* (2006.01)

(52) U.S. Cl.
CPC ...... *H02M 3/156* (2013.01); *H02M 2001/0009* (2013.01)
USPC ....................................................... 323/285

(58) Field of Classification Search
CPC .................................................... H02M 3/156
USPC ................. 323/282–285, 286, 290; 327/559
See application file for complete search history.

(56) References Cited

U.S. PATENT DOCUMENTS

| 4,315,316 | A | 2/1982 | Boros et al. ...................... 702/64 |
| 5,539,354 | A | 7/1996 | Carsten ......................... 327/559 |
| 5,602,464 | A | 2/1997 | Linkowsky et al. .......... 323/272 |
| 5,982,160 | A | 11/1999 | Walters et al. ................ 323/282 |
| 6,020,729 | A | 2/2000 | Stratakos et al. ............. 323/283 |
| 6,400,579 | B2 | 6/2002 | Cuk ................................ 363/16 |
| RE38,780 | E | 8/2005 | Hawkes et al. ............... 323/282 |
| 6,979,987 | B2 | 12/2005 | Kernahan et al. ............. 323/283 |
| 7,106,035 | B2 | 9/2006 | Xing ............................. 323/282 |
| 7,141,940 | B2 | 11/2006 | Ortiz ............................. 315/291 |
| 7,295,645 | B1 | 11/2007 | El-Ghoroury et al. ........ 375/345 |
| 7,358,710 | B2 | 4/2008 | Luo et al. ...................... 323/282 |
| 7,408,390 | B2* | 8/2008 | Yamada ........................ 327/124 |

(Continued)

FOREIGN PATENT DOCUMENTS

| CN | 102545611 A | 7/2012 |
| DE | 4423325 A1 | 1/1996 |

(Continued)

OTHER PUBLICATIONS

Stefanutti et al.; Reduction of Quantization Effects in Digitally Controlled dc-dc Converters using Inductor Current Estimation, Jun. 2006; IEEE; pp. 1-7.*

(Continued)

*Primary Examiner* — Gary L Laxton
*Assistant Examiner* — Alex Torres-Rivera

(57) ABSTRACT

A system includes an estimation module and a current measuring module. The estimation module estimates current through an inductor in an output stage of a power supply using a model of the current and generates an estimated current. The current measuring module measures the current through the inductor and generates a measured current. The estimation module adjusts the model based on the measured current.

14 Claims, 13 Drawing Sheets

(56) References Cited

U.S. PATENT DOCUMENTS

| | | | |
|---|---|---|---|
| 7,439,721 B2 | 10/2008 | Weng et al. | 323/286 |
| 7,511,472 B1 | 3/2009 | Xia et al. | 324/142 |
| 8,159,205 B1 | 4/2012 | Latham, II et al. | 323/286 |
| 8,285,502 B2* | 10/2012 | Kenly et al. | 702/64 |
| 8,575,911 B2* | 11/2013 | Cheng et al. | 323/283 |
| 2006/0055574 A1 | 3/2006 | Maksimovic et al. | 327/540 |
| 2007/0070660 A1 | 3/2007 | Tallam | 363/37 |
| 2007/0108951 A1 | 5/2007 | Coleman | 323/222 |
| 2007/0114985 A1 | 5/2007 | Latham et al. | 323/282 |
| 2008/0084200 A1 | 4/2008 | Kojori | 324/117 H |
| 2008/0303501 A1 | 12/2008 | Prodic | 323/283 |
| 2008/0316779 A1* | 12/2008 | Jayaraman et al. | 363/74 |
| 2009/0267580 A1 | 10/2009 | Derksen | 323/282 |
| 2010/0131219 A1 | 5/2010 | Kenly et al. | 702/64 |

FOREIGN PATENT DOCUMENTS

| | | | |
|---|---|---|---|
| DE | 69826319 T2 | | 2/2005 |
| DE | 102011117508 A1 | | 6/2012 |
| EP | 1524569 B1 | | 9/2008 |
| GB | 2452285 A | | 4/2009 |
| WO | WO 99/32891 | | 7/1999 |
| WO | WO2007/015182 | * | 2/2007 |
| WO | WO2007/015182 A2 | | 2/2007 |

OTHER PUBLICATIONS

Office Action dated May 31, 2013 from the German Patent Office for German Patent Application No. 10 2011 117 508.7.

English Translation of Office Action dated May 31, 2013 from the German Patent Office for German Patent Application No. 10 2011 117 508.7.

Buiatti, G.M. et al., Parameter Estimation of a DC/DC Buck converter using a continuous time model, 2007 European Conference on Power Electronics and Applications, Date: Sep. 2-5, 2007, pp. 1-8.

Lukic, Z. et al., Self-Tuning Digital Current Estimator for Low-Power Switching Converters, APEC 2008. Twenty-Third Annual IEEE Applied Power Electronics Conference and Exposition, 2008, Date: Feb. 24-28, 2008, pp. 529-534.

Hsieh, J. et al., Parameter Estimation Algorithm for Performance Fine Tuning of Switching DC Power Supplies, 22nd Annual IEEE Power Electronics Specialists Conference, 1991, PESC '91 Record., Date: Jun. 24-27, 1991, pp. 51-56.

Emadi, A. et al., Real Time State Estimation of Multi-Converter DC Power Electronic Systems Using Generalized State Space Averaging Method, 2002 IEEE 33rd Annual Power Electronics Specialists Conference, 2002, vol. 2, Date: 2002, pp. 881-886.

Mattavelli, P., Digital Control of dc-dc Boost Converters with Inductor Current Estimation, APEC '04, Nineteenth Annual Applied Power Electronics Conference and Exposition, 2004, vol. 1, Date: 2004, pp. 74-80, vol. 1.

Kelly, A. et al., A Self-Compensating Adaptive Digital Regulator for Switching Converters Based on Linear Prediction, APEC '06, Twenty-First Annual Applied Power Electronics Conference and Exposition, 2006, Date: Mar. 19-23, 2006, pp. 712-718.

Meola et al., Digital PFM Controller with Adaptive on Time based on Load Current Estimation, Power Electronics Specialists Conference, 2008. PESC 2008. IEEE, Date: Jun. 15-19, 2008, pp. 3695-3700.

Watts, D., Practical Averaging Circuits, IEEE Transactions on Automatic Control, vol. 10, Issue 3, Date: Jul. 1965, pp. 363-364.

Sanders, S.R. et al., Generalized Averaging Method for Power Conversion Circuits, IEEE Transactions on Power Electronics, vol. 6, Issue 2, Date: Apr. 1991, pp. 251-259.

Stefanutti, W. et al. Reduction of Quantization Effects in Digitally Controlled dc-dc Converters using Inductor Current Estimation, 37th Annual IEEE Power Electronics Specialists Conference, 2006, PESC '06 Record., Date: Jun. 18-22, 2006, pp. 1-7.

Written Opinion of the International Searching Authority, for International Application No. PCT/US09/65260, mailed Jan. 21, 2010.

Office Action dated Dec. 20, 2013 from the China Patent Office for Chinese Patent Application No. 201110361265.0.

* cited by examiner

INDUCTOR CURRENT MEASUREMENT FOR DC TO DC CONVERTERS

The present application is a continuation-in-part of U.S. patent application Ser. No. 12/959,456, filed on Dec. 3, 2010.

The present application is related to U.S. patent application Ser. No. 12/622,478 filed on Nov. 20, 2009.

The disclosures of the above applications are incorporated herein by reference in their entirety.

BACKGROUND

Field

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many analog and digital power supplies, including average current mode power supplies, include DC to DC converters. DC to DC converters can be of different types (e.g., Buck, boost, Buck-boost, fly-back, etc.). Buck type DC to DC converters include an inductor in an output stage. An output voltage of the DC to DC converter may be regulated in many ways. For example, in average current mode power supplies, current through the inductor (inductor current) may be used to regulate the output voltage. Accordingly, sensing the inductor current is an important function of a controller for high-efficiency DC to DC converters.

The sensed inductor current can be used in a variety of applications. For example, the applications may include over-current protection, adaptive voltage positioning, and loop control for current-mode power supplies. Additionally, the sensed inductor current can be used to determine when to switch from Continuous Conduction Mode (CCM) to Discontinuous Conduction Mode (DCM). Further, the sensed inductor current can be used to calculate load current in a state space based controller, where estimated capacitor current is available.

Methods for sensing the inductor current need to be accurate, low cost, and have minimum impact on the overall efficiency of a DC to DC converter. Several methods are currently used to sense the inductor current. Each of these methods, however, has some shortcomings that make these methods undesirable for a leading-edge, high-precision, and fast-transient DC to DC converter. Some of these methods are described below.

Referring now to FIG. 1, a converter 10 uses a high-precision resistance connected in series with the inductor to sense the inductor current. The converter 10 comprises a pulse-width modulation (PWM) controller 12, a pair of series-connected switches 14 and 16, an inductor L, a high-precision sensing resistor $R_{sense}$, a capacitor $C_{out}$, and an amplifier 20. $R_{dc}$ is a parasitic resistance of the inductor L.

The PWM controller 12 generates pulse-width modulated pulses that control on-off times of the switches 14 and 16. Current i flows through the inductor L and generates a voltage drop across the sensing resistor $R_{sense}$. The amplifier 20 has a gain of $A_v$ and amplifies the voltage drop across the sensing resistor $R_{sense}$. The output of the amplifier 20 is given by $i*R_{sense}*A_v$. The inductor current i can be determined from the output of the amplifier 20.

This method suffers from losses in the sensing resistor $R_{sense}$, which reduces the overall efficiency of the converter 10. Additionally, this method suffers from effects of noise since the voltage drop across the sensing resistor $R_{sense}$ used to sense the inductor current i is small. Further, the measurement circuits used to measure the inductor current i add a delay.

Instead of using the sensing resistor $R_{sense}$, an on-resistance ($R_{DSon}$) of the switches 14 and 16, can be used to sense the inductor current i. $R_{DSon}$ is a resistance between a drain and a source of a switch when the switch is on. When the switch is on, $R_{DSon}$ of the switch is in series with the inductor L, and the inductor current i generates a voltage drop across $R_{DSon}$ (i.e., $V_{DS}$), which can be measured to sense the inductor current i.

While this method does not affect the efficiency of the converter, this method is not very accurate since the value of $R_{DSon}$ varies based on temperature. Further, small signal levels of $V_{DS}$ pose noise problems. Additionally, measurement circuits used to measure the inductor current i add a delay.

Referring now to FIG. 2, a converter 30 uses a resistor and a capacitor connected in parallel to the inductor to sense the inductor current. The converter 30 comprises the PWM controller 12, the switches 14 and 16, the inductor L, and the capacitor $C_{out}$. Additionally, a resistor R and a capacitor C are connected across the inductor L as shown. $R_{DC}$, the parasitic resistance of the inductor L, serves as the sensing resistor.

The values of R and C are chosen so that the impedance of the RC circuit formed by the resistor R and the capacitor C matches the impedance of the inductor L. In other words, the values of R and C are chosen so that the time constant of the RC circuit matches the time constant of the LR circuit formed by the inductor L and the parasitic resistance $R_{DC}$. That is, the values of R and C are chosen so that $R*C \approx L/R_{DC}$.

When $R*C \approx L/R_{DC}$, the voltage across the capacitor C is linearly proportional to the inductor current i. The amplifier 40 amplifies the voltage across the capacitor C and generates an output equal to $i*R_{DC}*A_v$. The inductor current i can be determined from the output of the amplifier 40.

The accuracy of this approach depends on how closely the impedance of the RC circuit matches the impedance of the inductor L. Further, small voltage levels across the capacitor C pose noise problems. Particularly, the sensed inductor current may include high-frequency noise. Additionally, measurement circuits used to measure the inductor current i add a delay.

SUMMARY

A system comprises an averaging module, a high pass filter module, a first estimation module, a sensing module, and a combining module. The averaging module receives an output voltage of a power supply and that generates an average output voltage. The high pass filter module receives an average switching voltage used to control switches in an output stage of the power supply and filters a difference between the average output voltage and the average switching voltage. The estimation module estimates a first filtered current through an inductor in the output stage based on an output of the high pass filter module. The sensing module senses voltage across the inductor and estimates a second current through the inductor. The low pass filter module filters the second current. The combining module combines the first filtered current and the second filtered current to generate an estimated current through the inductor.

In other features, the high pass filter module includes a high pass filter having a first corner frequency. The low pass filter module includes a low pass filter having a second corner frequency. The first corner frequency is equal to the second corner frequency.

In other features, the high pass filter module includes a high pass filter having a first gain. The low pass filter module includes a low pass filter having a second gain. The first gain is equal to the second gain.

In other features, the high pass filter module includes a high pass filter having a first pole. The low pass filter module includes a low pass filter having a second pole. The first pole is equal to the second pole.

In another feature, the sensing module comprises a circuit connected across the inductor. An impedance of the circuit matches an impedance of the inductor.

In another feature, the estimation module estimates the first current through the inductor by using a model of the inductor.

In other features, the high pass filter module, the estimation module, the low pass filter module, and the combining module are implemented using at least one of passive and active analog components including resistances, capacitances, and operational amplifiers.

In other features, the high pass filter module, the estimation module, the low pass filter module, and the combining module are implemented using digital logic including adders, multipliers, and a delay stage.

In other features, the high pass filter module, the estimation module, the low pass filter module, and the combining module are implemented using firmware including instructions executable by a digital signal processor (DSP) controlling the converter.

In still other features, a method comprises generating an average output voltage by averaging an output voltage of a power supply. The method further comprises filtering using a high pass filter a difference between the average output voltage and an average switching voltage used to control switches in an output stage of the power supply. The method further comprises estimating a first filtered current through an inductor in the output stage based on an output of the high pass filter and estimating a second current through the inductor by sensing voltage across the inductor. The method further comprises filtering the second current using a low pass filter and combining the first filtered current and the second filtered current to generate an estimated current through the inductor.

In other features, the method further comprises configuring the high pass filter to have a first corner frequency and configuring the low pass filter to have a low pass filter having a second corner frequency, where the first corner frequency is equal to the second corner frequency.

In other features, the method further comprises configuring the high pass filter to have a first gain and configuring the low pass filter to have a low pass filter having a second gain, where the first gain is equal to the second gain.

In other features, the method further comprises configuring the high pass filter to have a first pole and configuring the low pass filter to have a low pass filter having a second pole, where the first pole is equal to the second pole.

In another feature, the method further comprises sensing the voltage across the inductor by using a circuit connected across the inductor, where an impedance of the circuit matches an impedance of the inductor.

In other features, the method further comprises generating a model of the inductor and estimating the first current through the inductor by using the model.

In still other features, a system comprises an estimation module and a current measuring module. The estimation module estimates current through an inductor in an output stage of a power supply using a model of the current and generates an estimated current. The current measuring module measures the current through the inductor and generates a measured current. The estimation module adjusts the model based on the measured current.

In other features, the system further comprises a compensator module that compensates the measured current for a measuring delay. The estimation module adjusts the model based on the measured current that is compensated for the measuring delay.

In other features, the system further comprises a voltage measuring module that measures an output voltage of the power supply and that generates a measured output voltage. The estimation module adjusts the model based on the measured output voltage.

In other features, the estimation module adjusts the model based on a difference between the measured current and the estimated current.

In other features, the system further comprises a voltage measuring module that measures an output voltage of the power supply and that generates a measured output voltage. The estimation module adjusts the model based on a difference between the measured output voltage and an average switching voltage used to control switches of the power supply.

In other features, the estimation module estimates the current through the inductor based on a difference between the measured current and the estimated current.

In other features, the estimation module estimates the current through the inductor based on a difference between an output voltage of the power supply and an average switching voltage used to control switches of the power supply.

In other features, the estimation module comprises a first subtractor that generates a first difference between the measured current and the estimated current and a compensator module that compensates the first difference for a delay in measuring the current through the inductor. The estimation module comprises a second subtractor that generates a second difference between an output voltage of the power supply and an average switching voltage used to control switches of the power supply. The estimation module comprises an adder that generates a sum based an output of the compensator module, the second difference, and the estimated current. The estimation module generates the estimated current based on the sum.

In still other features, a method comprises estimating current through an inductor in an output stage of a power supply using a model of the current to generate an estimated current, measuring the current through the inductor to generate a measured current, and adjusting the model based on the measured current.

In other features, the method further comprises compensating the measured current for a measuring delay, and adjusting the model based on the measured current that is compensated for the measuring delay.

In other features, the method further comprises measuring an output voltage of the power supply to generate a measured output voltage, and adjusting the model based on the measured output voltage.

In other features, the method further comprises adjusting the model based on a difference between the measured current and the estimated current.

In other features, the method further comprises measuring an output voltage of the power supply to generate a measured output voltage, and adjusting the model based on a difference between the measured output voltage and an average switching voltage used to control switches of the power supply.

In other features, the method further comprises estimating the current through the inductor based on a difference between the measured current and the estimated current.

In other features, the method further comprises estimating the current through the inductor based on a difference between an output voltage of the power supply and an average switching voltage used to control switches of the power supply.

In other features, the method further comprises generating a first difference between the measured current and the estimated current, and compensating the first difference for a delay in measuring the current through the inductor. The method further comprises generating a second difference between an output voltage of the power supply and an average switching voltage used to control switches of the power supply. The method further comprises generating a sum based the compensated first difference, the second difference, and the estimated current. The method further comprises generating the estimated current based on the sum.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
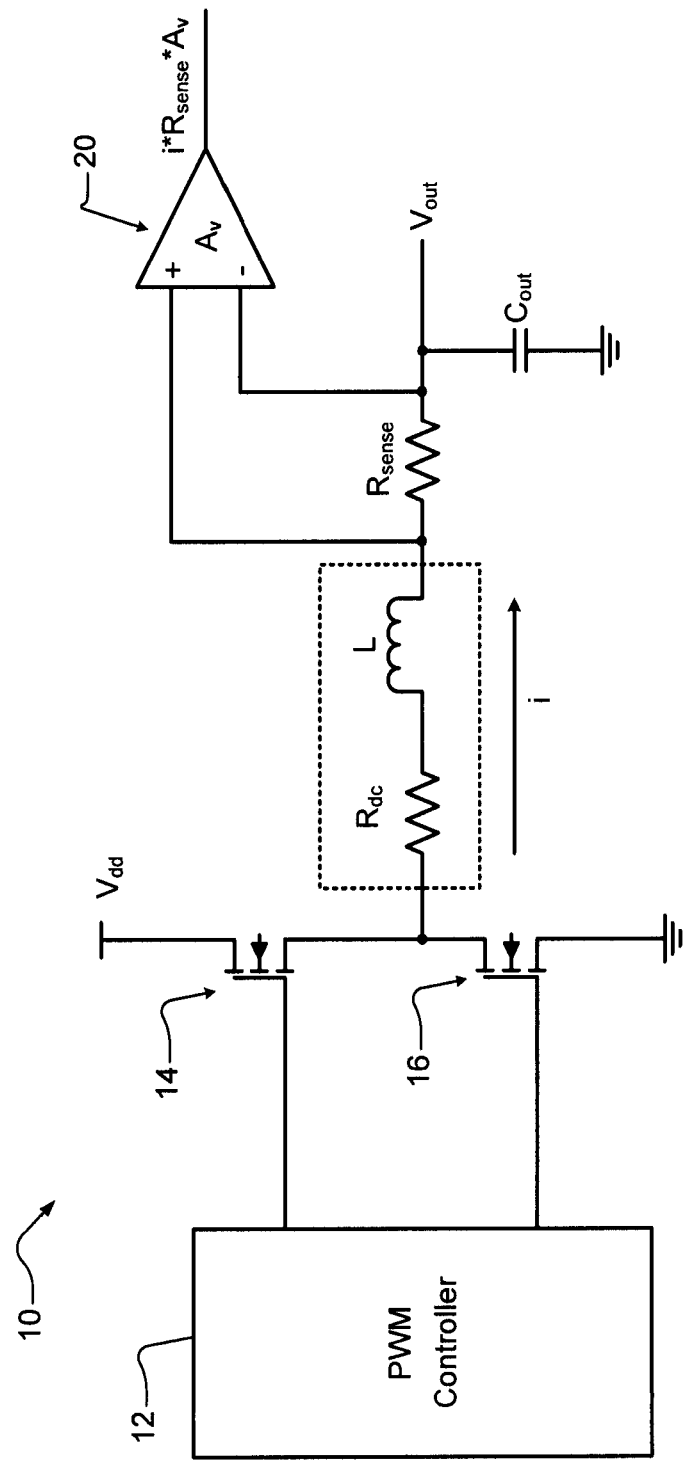
FIG. 1 depicts a DC to DC converter that uses a resistor connected in series with an inductor to sense an inductor current.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 3A:
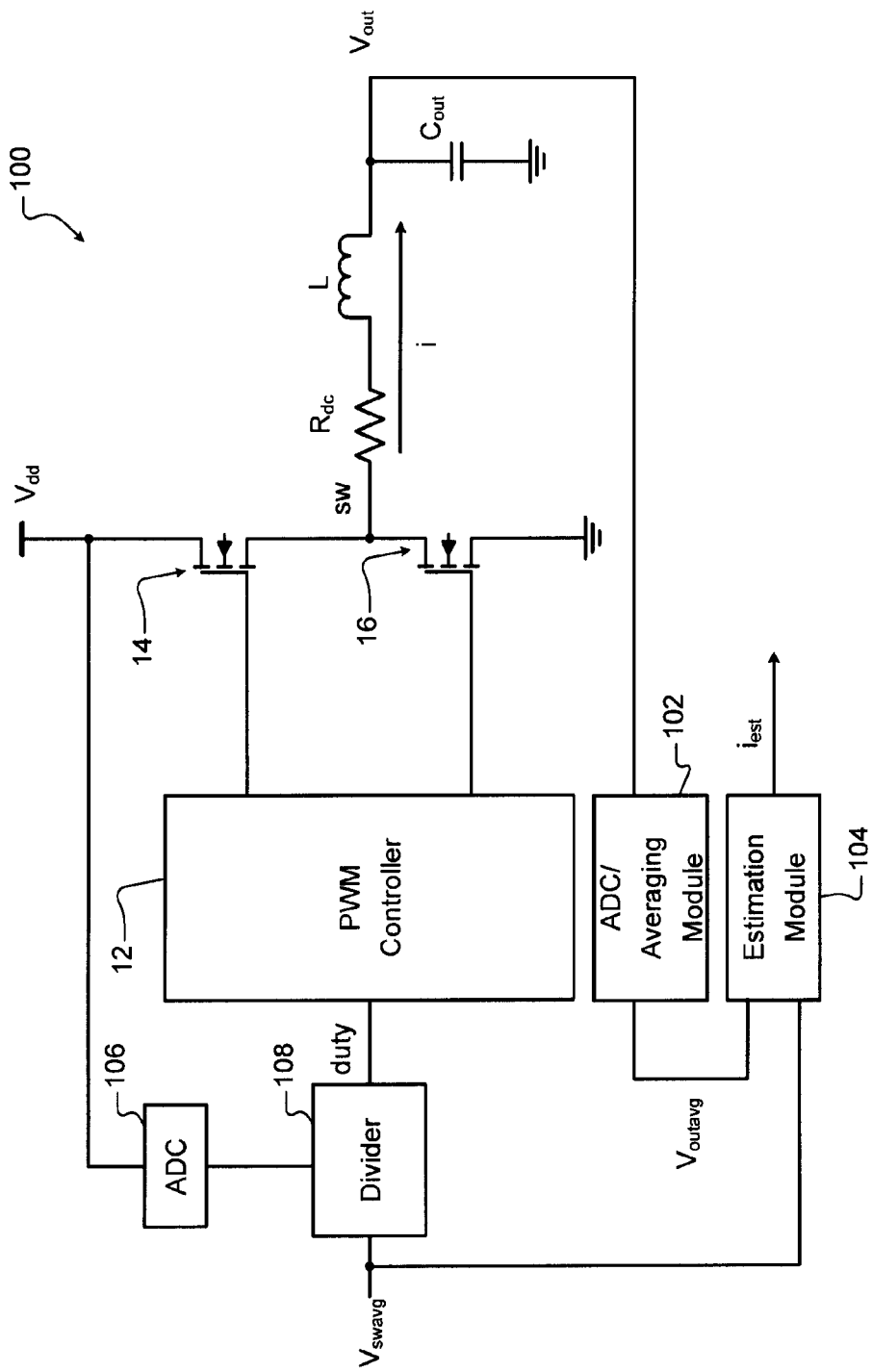
FIGS. 3A and 3B depict a system that uses a mathematical model to estimate an average inductor current.
Figure 3B:
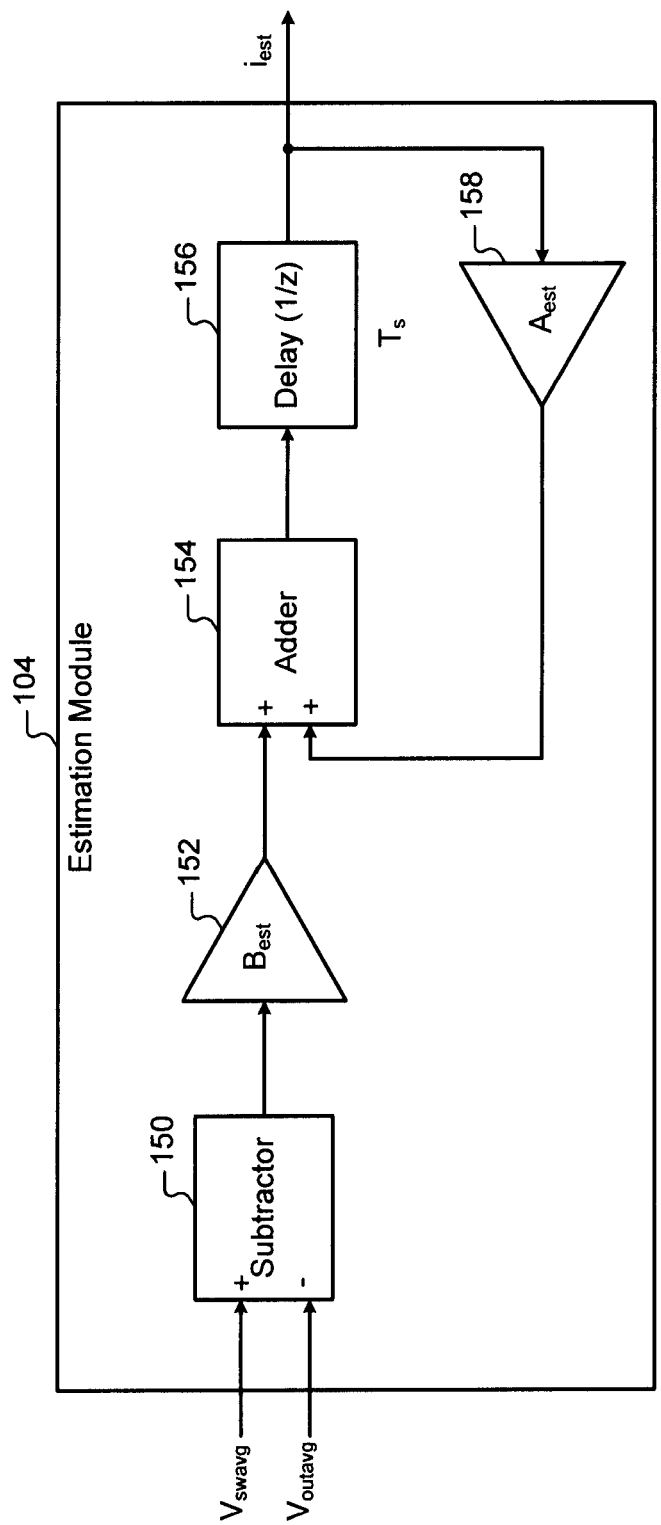

Referring now to FIGS. 3A and 3B, a system 100 uses a mathematical model to estimate an average inductor current. A detailed description of the mathematical model can be found in U.S. patent application Ser. No. 12/622,478 filed Nov. 20, 2009, which is incorporated herein by reference in its entirety. A brief description of the system 100 follows.

In FIG. 3A, the system 100 comprises the PWM controller 12, the switches 14 and 16, the inductor L, and the capacitor $C_{out}$. Additionally, the system 100 comprises an ADC/Averaging module 102, an estimation module 104, an ADC 106, and a divider 108. The ADC/Averaging module 102 digitizes an output voltage across the capacitor $C_{out}$ and generates average values of the output voltage ($V_{outavg}$). The ADC 106 digitizes an input voltage $V_{dd}$. The divider 108 divides an average switching voltage $V_{avgsw}$ by the input voltage $V_{dd}$. The average switching voltage $V_{avgsw}$ is the average voltage of the signal used to control duty cycle of the switches 14 and 16. The PWM controller 12 determines a duty cycle of the pulses that drive the switches 14 and 16 based on the ratio $V_{avgsw}/V_{dd}$.

The average switching voltage $V_{avgsw}$ and the average values of the output voltage are input to the estimation module 104. The estimation module 104 combines the average switching voltage $V_{avgsw}$ and the average values of the output voltage to estimate an average inductor current. The estimation module 104 uses the mathematical model summarized below to estimate the average inductor current $i_{est}$.

In FIG. 3B, the estimation module 104 is shown in detail. The estimation module comprises a subtractor 150, a multiplier 152, an adder 154, a delay stage 156, and a multiplier 158. The subtractor 150 generates a difference between the average switching voltage $V_{avgsw}$ and the average values of the output voltage. The multiplier 152 multiplies the output of the subtractor 150. The adder 154 adds the output of the multiplier 152 and an output of the multiplier 158. The delay stage 156 delays an output of the adder 154. The multiplier 158 multiplies the output of the delay stage 156. The output of the delay stage 156 is the estimated inductor current $i_{est}$.

Mathematically, an instantaneous inductor current is given by the following equation:

$$L\frac{di(t)}{dt} = Vsw(t) - R*i(t) - vout(t)$$

When averaged over a PWM cycle, the equation reduces to:

$$L\frac{1}{T}\frac{d}{dt}\int_0^T i(t)dt = \frac{1}{T}\int_0^T Vsw(t)dt - R\frac{1}{T}\int_0^T i(t)dt - \frac{1}{T}\int_0^T vout(t)dt$$

Using the definition of averaging over one period, the equation simplifies to:

$$L\frac{davgi(t)}{dt} = Vavgsw(t) - R*avgi(t) - vout(t)$$

where $V_{avgsw}$ is the average switching voltage, avgi is the average inductor current, vout is the measured or estimated output voltage, L is the inductance of the inductor L, and R is the DC resistance of the power stage.

These differential equations may be simplified to a discrete time equation of the form:

$$avgi(n+1)=A_{est}*avgi(n)+B_{est}*(V_{avgsw}(n)-vest(n)),$$

where $A_{est}$ and $B_{est}$ are multipliers, n denotes a current sampling time, and (n+1) denotes a subsequent sampling time. Typically, since the time constant of the inductor L (L/R) is much larger than a sampling time $T_s$, $A_{est}$ and $B_{est}$ can be approximated as $B_{est}=T_s/L$, and $A_{est}=1-R*T_s/L$.

The above method estimates the average inductor current using the mathematical model of the inductor and the DC resistance of the power stage. This method does not have noise problems since this method uses the mathematical model instead of relying on noise sensitive measurements. This method, however, estimates the average inductor current based on the duty cycle (since $V_{avgsw}$ is proportional to the duty cycle) and the output voltage. Accordingly, this method has problems with DC offset due to errors in the duty cycle.

The present disclosure relates to generating a composite estimate of inductor current using a combination of two methods: the method that uses impedance matched circuit to sense the inductor current, and the method that uses the mathematical model to estimate the inductor current. The DC offset problem associated with the method that uses the mathematical model is eliminated by filtering the input to the estimation module with a high-pass filter. The high-frequency noise problem associated with the method that uses the impedance matched circuit is eliminated by filtering the sensed inductor current with a low-pass filter. The outputs of the estimation module and the low-pass filter are combined to generate a composite estimate inductor current that is free of the DC offset and the high-frequency noise.

Thus, the present disclosure provides a method for sensing the inductor current without noise problems and with no impact on the overall efficiency of the converter. The method of generating the composite estimate of inductor current disclosed herein blends the advantages of no loss and low cost of the impedance matching method with the noise-free current estimate generated by the mathematical modeling method. Accordingly, the method disclosed herein produces a high bandwidth, low noise, and accurate estimate of the inductor current at low cost. The method disclosed herein can be implemented using analog hardware, digital hardware, firmware, or a combination thereof.

Figure 4:
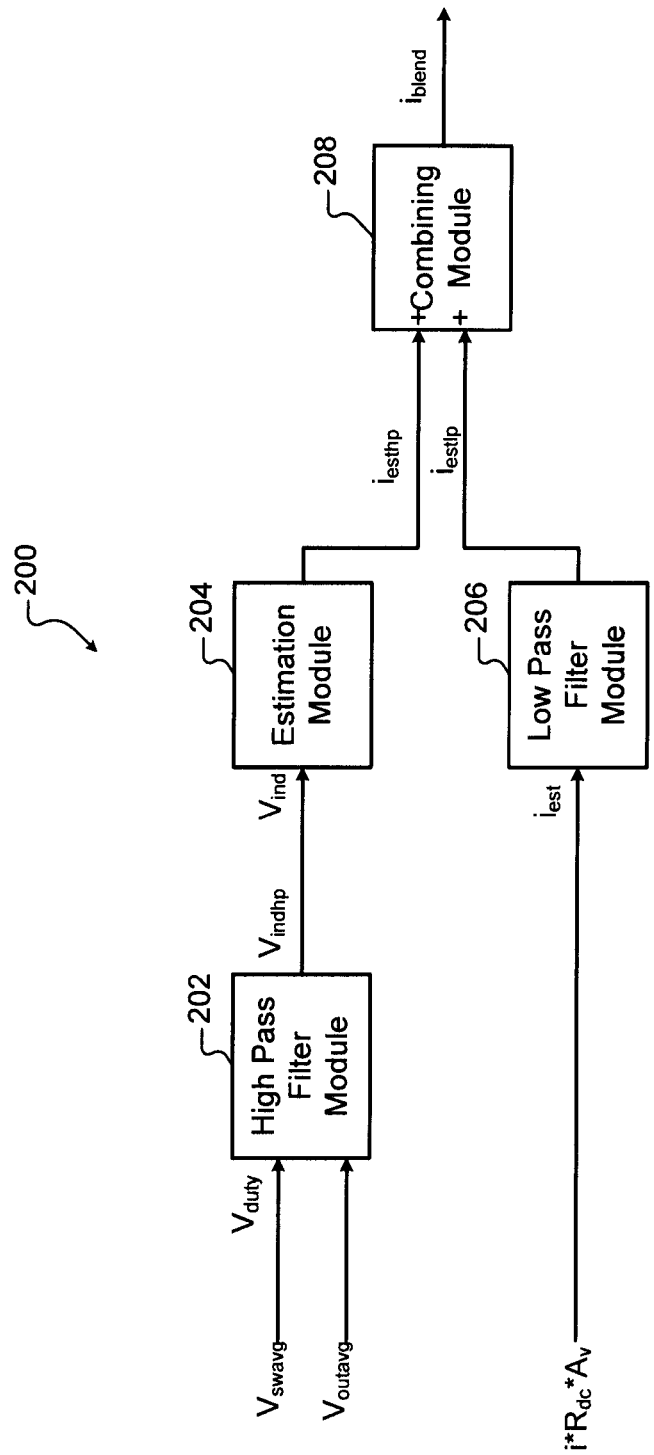
FIG. 4 is a functional block diagram of a system for sensing an inductor current according to the present disclosure.

Referring now to FIG. 4, a functional block diagram of a system 200 for sensing the inductor current according to the present disclosure is shown. The system 200 comprises a high pass filter module 202, an estimation module 204, a low pass filter module 206, and a combining module 208. The high pass filter module 202 includes a high pass filter. The low pass filter module 206 includes a low pass filter. The high pass filter and the low pass filter have the same corner frequency (i.e., 3 dB cutoff frequency) and the same gain.

The corner frequency and the gain of the high pass filter and the low pass filter can be selected by a user. For example, the user may communicate with the controller using power management bus (PMbus) commands or graphical user interface (GUI) commands to select the corner frequency and the gain.

The high pass filter module 202 receives the average output voltage of the converter ($V_{outavg}$) and the average switching voltage $V_{avgsw}$, which is available from the controller that controls the converter. The average switching voltage $V_{avgsw}$ is proportional to the duty cycle. Accordingly, the average switching voltage $V_{avgsw}$ can also be referred to as $V_{duty}$ (i.e., the duty cycle voltage). The high pass filter module 202 filters $V_{avgsw}$ and $V_{outavg}$. The output of the high pass filter module 202, $V_{indhp}$, is free of the DC offset. $V_{indhp}$ is input to the estimation module 204. The estimation module 204 uses the mathematical model described above to estimate the inductor current and generates the estimated inductor current $i_{esthp}$ that is free of DC offset.

Figure 2:
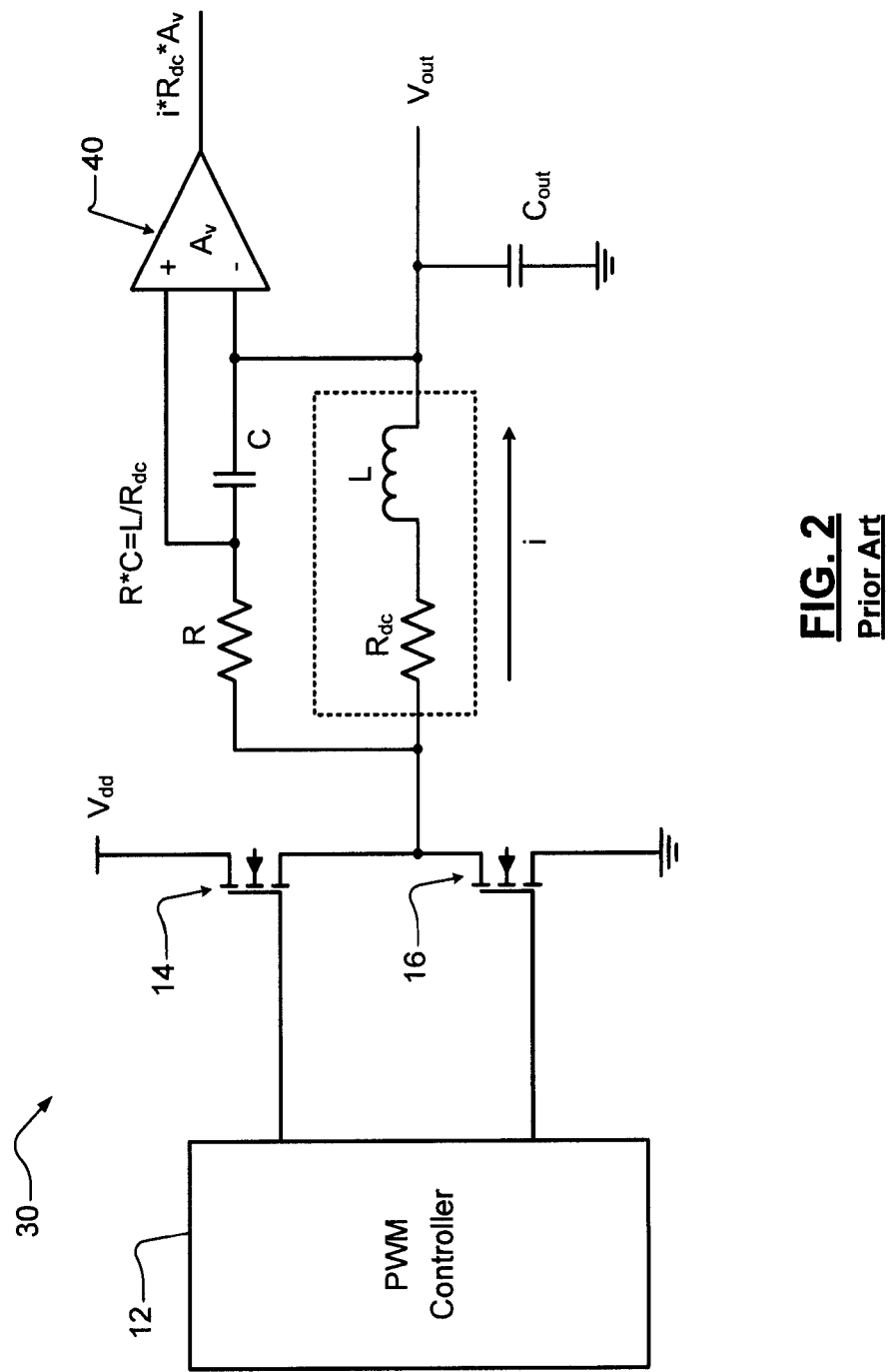
FIG. 2 depicts a DC to DC converter that uses a resistor and a capacitor connected in parallel to an inductor to sense an inductor current.

The low pass filter module 206 filters the inductor current $i_{est}$ sensed using the impedance matching method described above (see description of FIG. 2). The low pass filter module 206 removes the high-frequency noise from the sensed inductor current $i_{est}$ and outputs $i_{estlp}$, which is free of the high-frequency noise. The combining module 208 combines the output of the estimation module 204, $i_{esthp}$, and the output of the low pass filter module 206, $i_{estlp}$, to generate a blended inductor current $i_{blend}$ that is free of the DC offset and the high-frequency noise.

Figure 5:
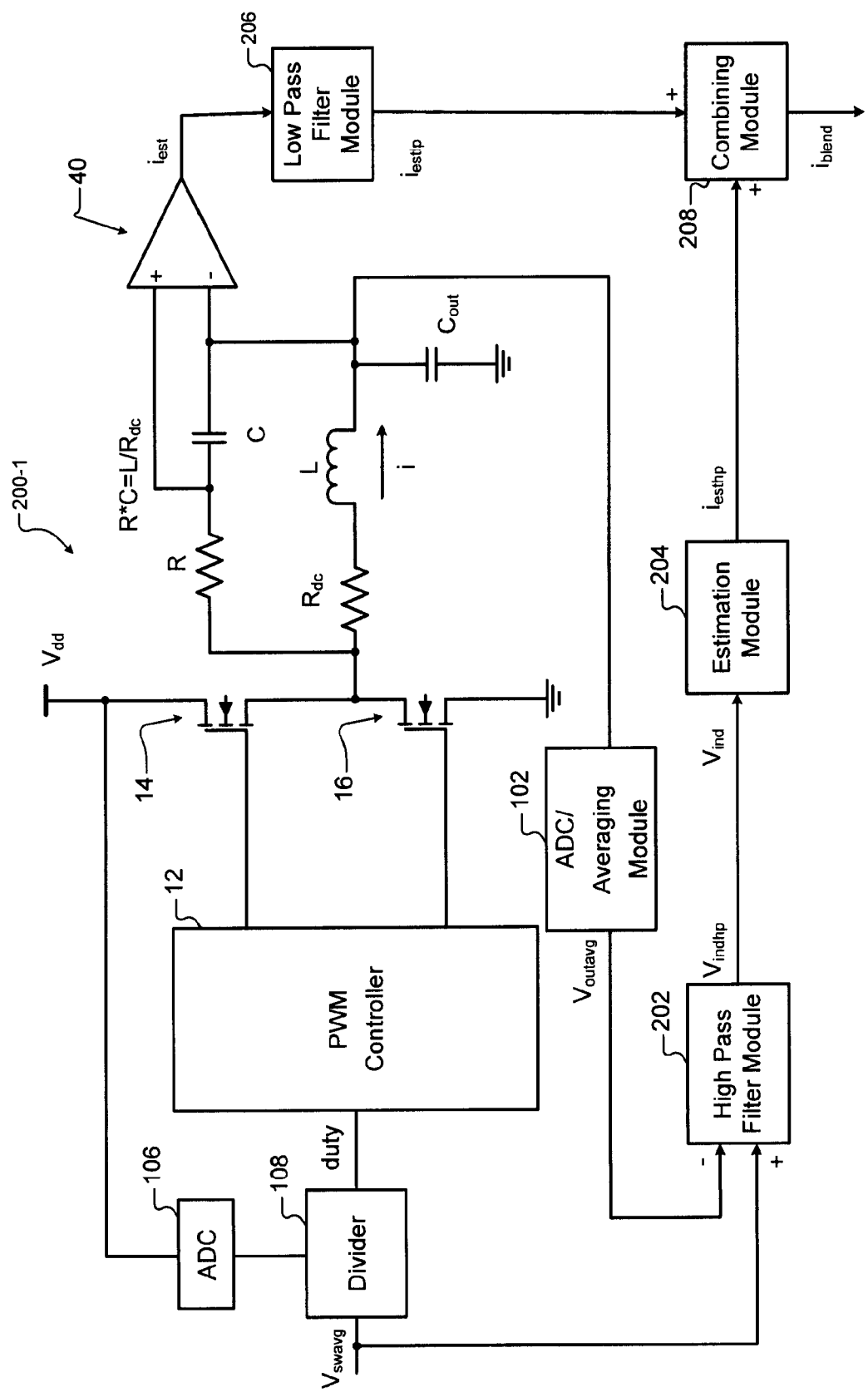
FIG. 5 is a detailed functional block diagram of a system for sensing an inductor current according to the present disclosure.

Referring now to FIG. 5, a system 200-1 is shown. The system 200-1 comprises the converter 30 shown in FIG. 2, the system 100 shown in FIGS. 3A and 3B, and the system 200 shown in FIG. 4. The operation of the converter 30, the system 100, and the system 200 is described above and is not repeated.

Figure 6A:
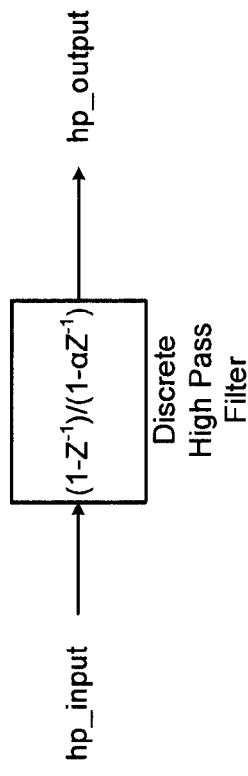
FIGS. 6A-6D depict different implementations of a high pass filter module used in FIGS. 4 and 5.
Figure 6B:
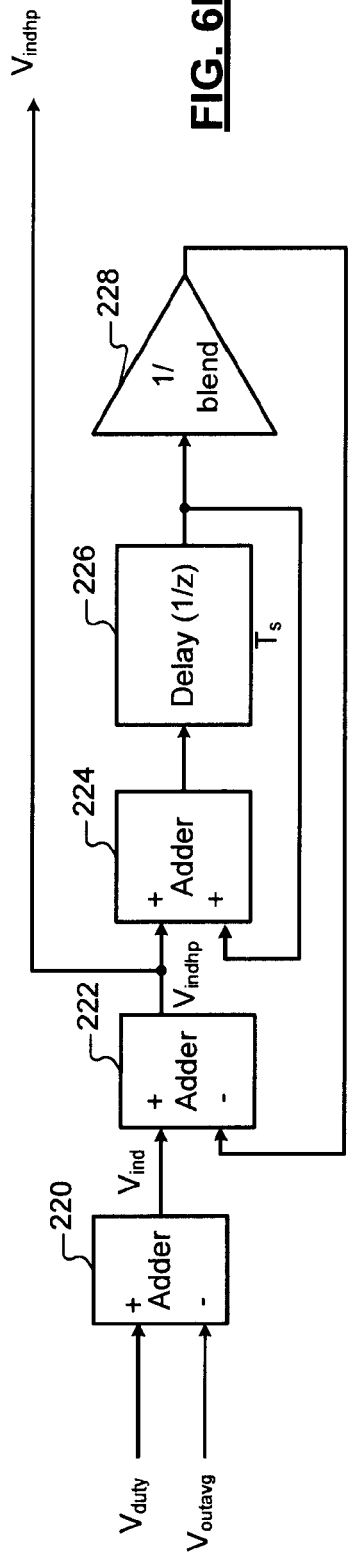
Figure 6D:
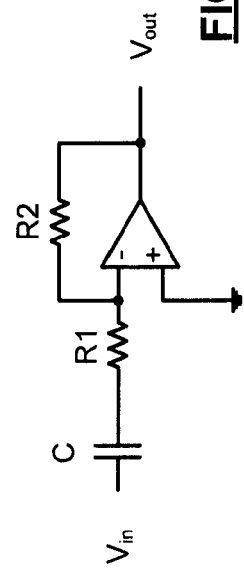
Figure 6C:
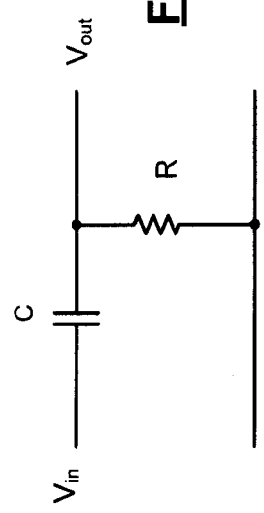
Figure 7:
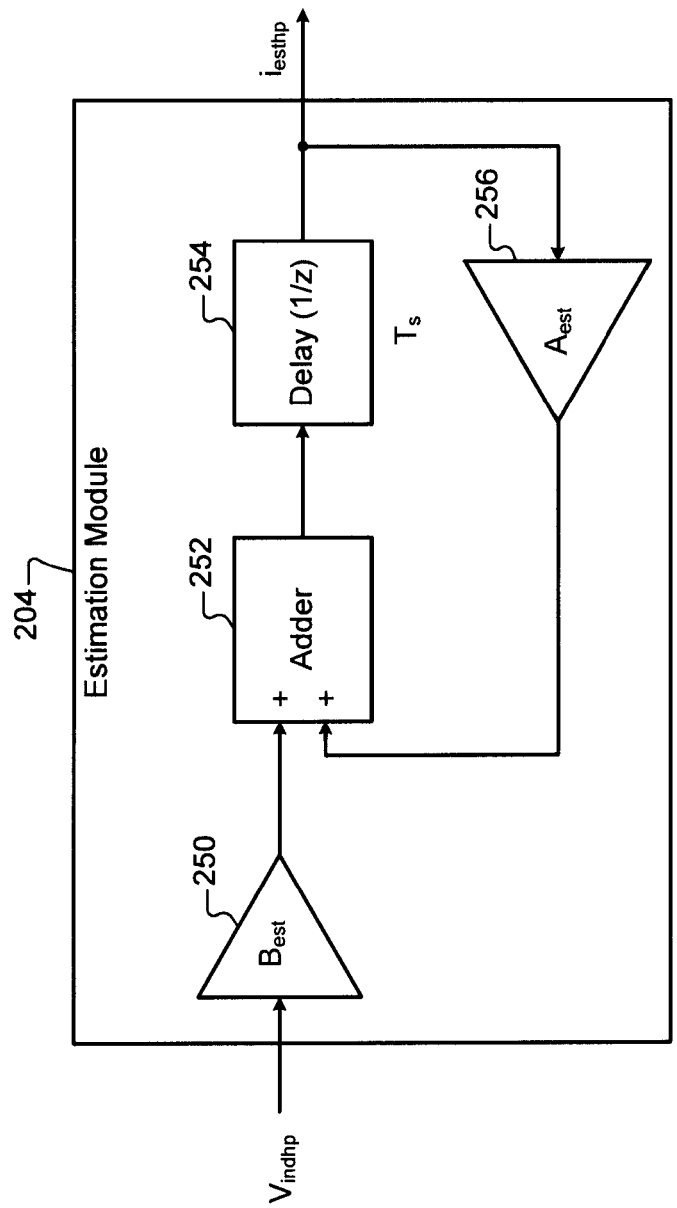
FIG. 7 is a functional block diagram of an estimation module used in FIGS. 4 and 5.

Referring now to FIGS. 6A-8D, different implementations (e.g., analog, digital, and firmware implementations) of each module of the system 200 are shown. In FIGS. 6A-6D, different implementations of the high pass filter module 202 are shown. In FIG. 7, a digital implementation of the estimation module 204 is shown. In FIGS. 8A-8D, different implementations of the low pass filter module 206 are shown.

In FIG. 6A, a discrete high pass filter (e.g., a first order high pass digital filter) is shown, where α is the pole of the high pass filter in Z domain. In FIG. 6B, a digital implementation of the discrete high pass filter comprising adders, a delay stage, and a gain stage is shown. Adders 220, 222, and 224 represent summing junctions. A delay stage 226 adds a delay denoted by 1/z. A gain stage 228 is implemented using a multiplier, where blend (i.e., gain)=1/(1−α).

The high pass filter module 202 can be implemented by firmware in a digital signal processor (DSP) based power controller. The firmware may include code for the following equations:

$$V_{ind} = V_{duty}(n) - V_{out}(n), \text{and}$$

$$V_{indhp} = V_{ind}(n) + V_{indhp}*(1-1/\text{blend}) - V_{ind}(n-1),$$

where n denotes a current sampling time, and (n−1) denotes a previous sampling time. Substituting blend=1/(1−α), the equation for $V_{indhp}$ becomes $$V_{indhp} = V_{ind}(n) + V_{indhp}*\alpha - V_{ind}(n-1).$$

In FIGS. 6C and 6D, analog implementations of the high pass filter are shown. In FIG. 6C, an analog high pass filter implemented using passive components (an RC circuit) is shown. The corner frequency of the high pass filter is given by $f_c = 1/2\pi RC$. In FIG. 6D, an analog high pass filter implemented using active components is shown. The corner frequency of the high pass filter is given by $f_c = 1/2\pi R_1 C$. The high-frequency signals are inverted and amplified by $R_2/R_1$. Accordingly, the gain of the high pass filter is $(-R_2/R_1)$.

In FIG. 7, the estimation module 204 comprises a multiplier 250, an adder 252, a delay stage 254, and a multiplier 256. The input to the estimation module is the output $V_{indhp}$ of the high pass filter module 202, which is free of the DC offset. The multiplier 250 multiplies $V_{indhp}$. The adder 252 adds the output of the multiplier 250 and an output of the multiplier 256. The delay stage 254 delays an output of the adder 252. The multiplier 256 multiplies the output of the delay stage 254. The output of the delay stage 254 is the estimated inductor current $i_{esthp}$, which is free of the DC offset. Typically, since the time constant of the inductor L (L/R) is much larger than the sampling time $T_s$, $A_{est}$ and $B_{est}$ can be approximated as $B_{est} = T_s/L$, and $A_{est} = 1 - R_{dc}*T_s/L$.

The estimation module 204 can be implemented by firmware in a DSP based power controller. The firmware may include code for the following equation:

$$i_{est}(n+1) = A_{est}*i_{est}(n) + B_{est}*V_{indhp}(n),$$

where n denotes a current sampling time, and (n+1) denotes a subsequent sampling time.

Figure 8A:
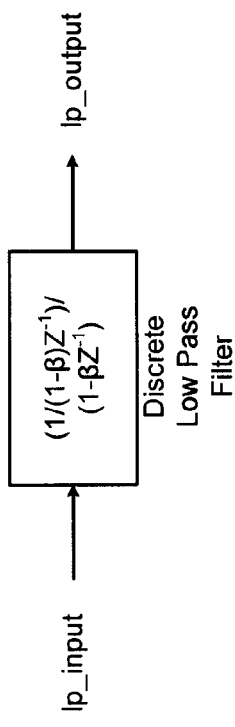
FIGS. 8A-8D depict different implementations of a low pass filter module used in FIGS. 4 and 5.
Figure 8B:
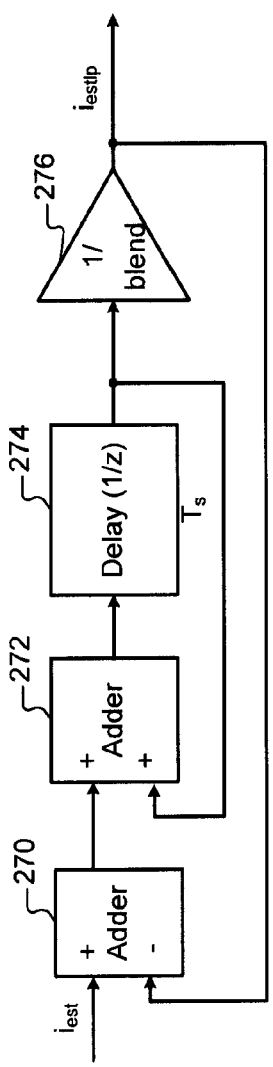

In FIG. 8A, a discrete low pass filter (e.g., a first order high pass digital filter) is shown, where β is the pole of the low pass filter in Z domain. In FIG. 8B, a digital implementation of the discrete low pass filter comprising adders, a delay stage, and a gain stage is shown. Adders 270 and 272 represent summing junctions. A delay stage 274 adds a delay denoted by 1/z. A gain stage 276 is implemented using a multiplier, where β=1/(1−blend).

The low pass filter module 206 can be implemented by firmware in a DSP based power controller. The firmware may include code for the following equation:

$$i_{estlp}(n) = \text{blend}*i_{est}(n-1) + (1-1/\text{blend})*i_{estlp}(n-1).$$

where n denotes a current sampling time, and (n−1) denotes a previous sampling time. Alternatively, $$i_{estlp}(n) = \beta*i_{est}(n-1) + (1-1/\beta)*i_{estlp}(n-1).$$

Figure 8D:
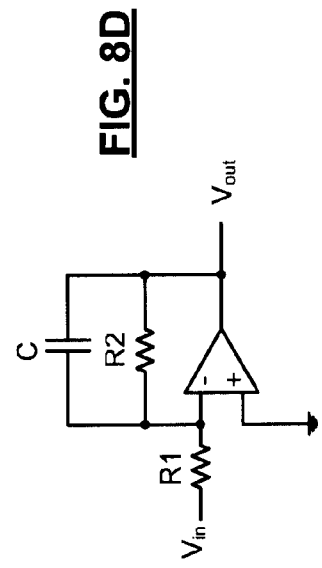
Figure 8C:
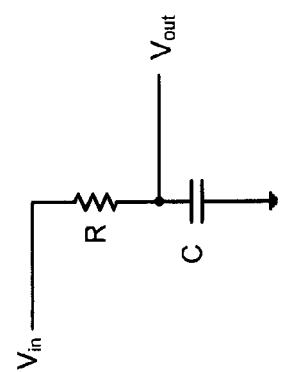

In FIGS. 8C and 8D, analog implementations of the low pass filter are shown. In FIG. 6C, an analog low pass filter implemented using passive components (an RC circuit) is shown. The corner frequency of the low pass filter is given by $f_c = 1/2\pi RC$. In FIG. 8D, an analog low pass filter implemented using active components is shown. The corner frequency of the low pass filter is given by $f_c = 1/2\pi R_2 C$. The gain of the low pass filter is $(-R_2/R_1)$.

The combining module 208 combines the output of the estimation module 204, $i_{esthp}$, and the output of the low pass filter module 206, $i_{estlp}$, to generate the composite estimate of inductor current, $i_{blend}$, which is given by the following equation:

$$i_{blend} = i_{esthp} + i_{estlp}.$$

The pole of the low pass filter module 206 is the same as the pole of the high pass filter module 202. Accordingly, the composite estimate of inductor current $i_{blend}$ has no DC offset and high frequency noise and has high bandwidth, high precision, and low noise.

Figure 9A:
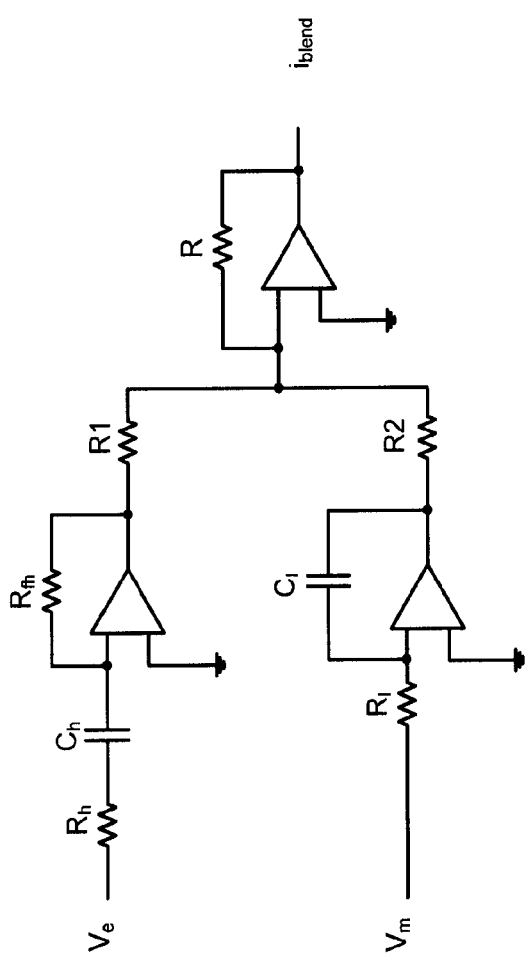
FIG. 9A is an analog implementation of the system of FIG. 4.

Referring now to FIG. 9A, an analog implementation of the system 200 is shown. In FIG. 9A, the subscript 'h' in a component symbol indicates that the component is part of a high pass filter, and the subscript 'l' in a component symbol indicates that the component is part of a low pass filter. $V_e$ represents an estimated current input to a high pass filter. $V_m$ represents a measured current input to a low pass filter. Output $i_{blend}$ is a blend of the estimated current $V_e$ and the measured current $V_m$ and is given by the following equation:

$$i_{blend} = (R/R1)*(R_{fh}*C_h*s)/(R_{fh}*C_h*s+1) + (R/R2)*(R_f/R_l*C_l*s+1),$$

s is a Laplace transform variable. Values of resistances and capacitances shown in FIG. 9a are selected so that the above equation is satisfied.

Figure 9B:
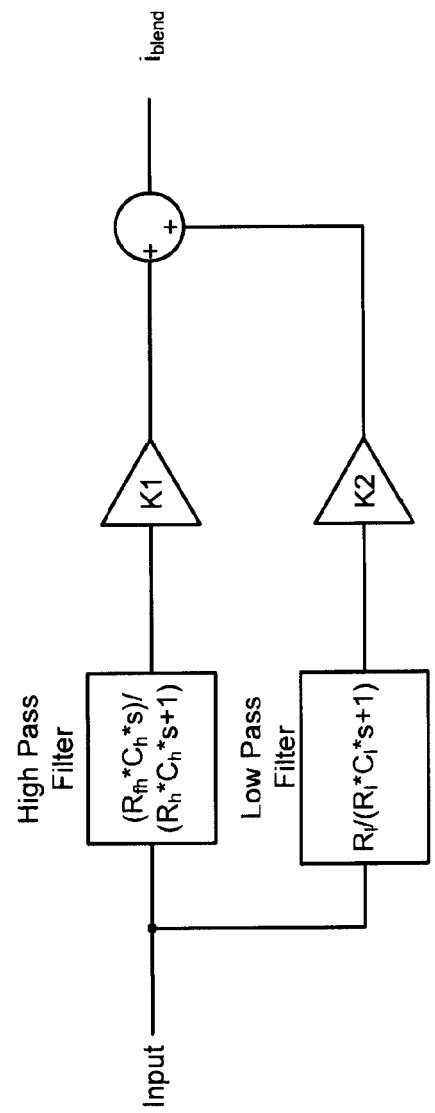
FIG. 9B is a simulated representation of the analog implantation shown in FIG. 9A.

Referring now to FIG. 9B, a simulated representation of the analog implantation is shown. K1=R/R1, and K2=R/R2.

Figure 10:
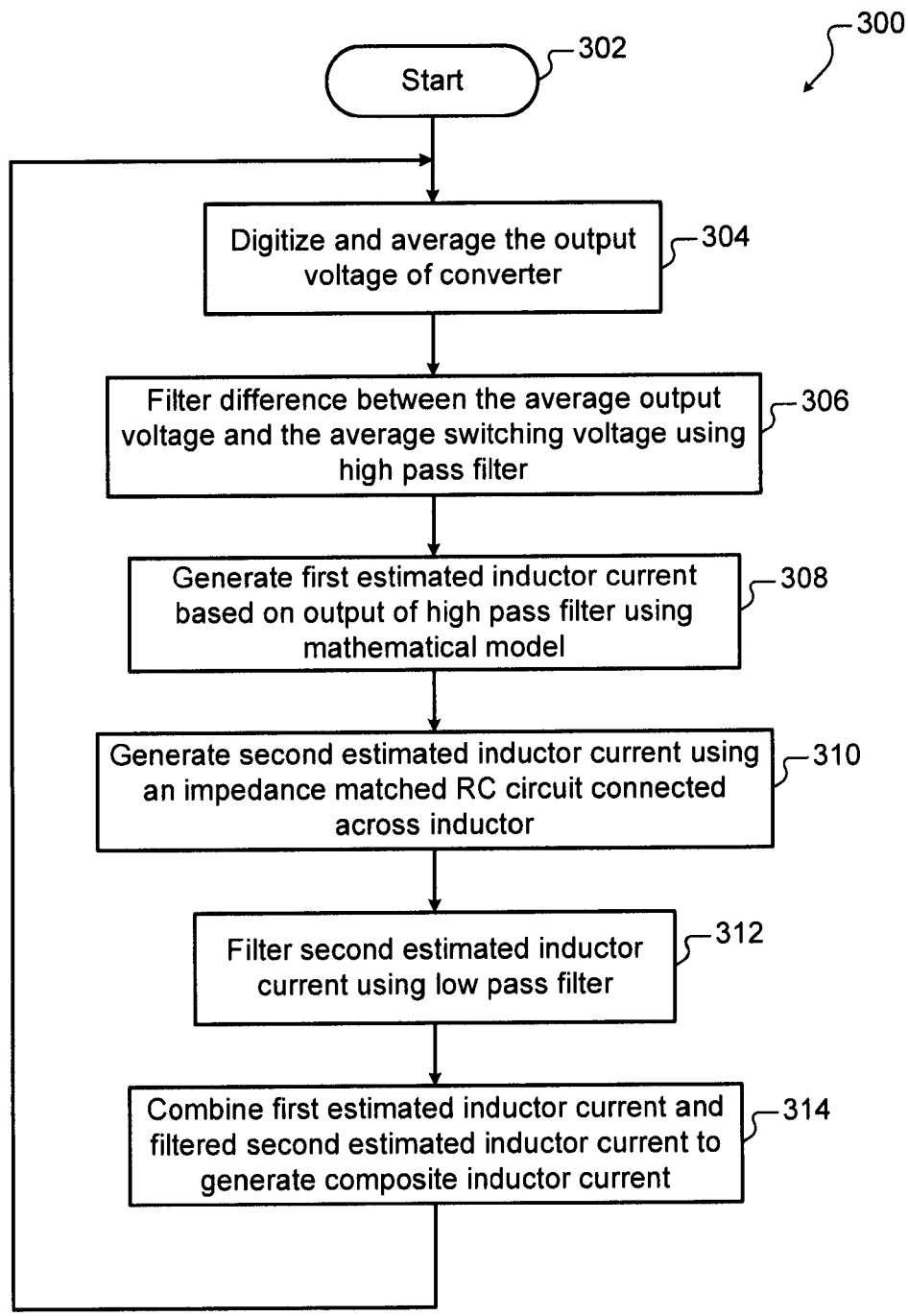
FIG. 10 is a flowchart of a method for sensing an inductor current according to the present disclosure.

Referring now to FIG. 10, a method 300 for estimating inductor current according to the present disclosure is shown. Control begins at 302. At 304, control digitizes and averages the output voltage of the converter. At 306, control filters the difference between the average output voltage and the average switching voltage using high pass filter and removes DC offset. At 308, control generates a first estimated inductor current using a mathematical model of the inductor and the DC resistance of the output stage of the converter.

At 310, control generates a second estimated inductor current from the inductor voltage sensed using an impedance-matched RC circuit connected across the inductor. At 312, control filters the second estimated inductor current using a low pass filter and removes high-frequency noise. At 314, control combines the first estimated inductor current and the filtered second estimated inductor current to produce the composite estimate of inductor current, which has no DC offset and high-frequency noise. Control returns to 304.

Figure 11:
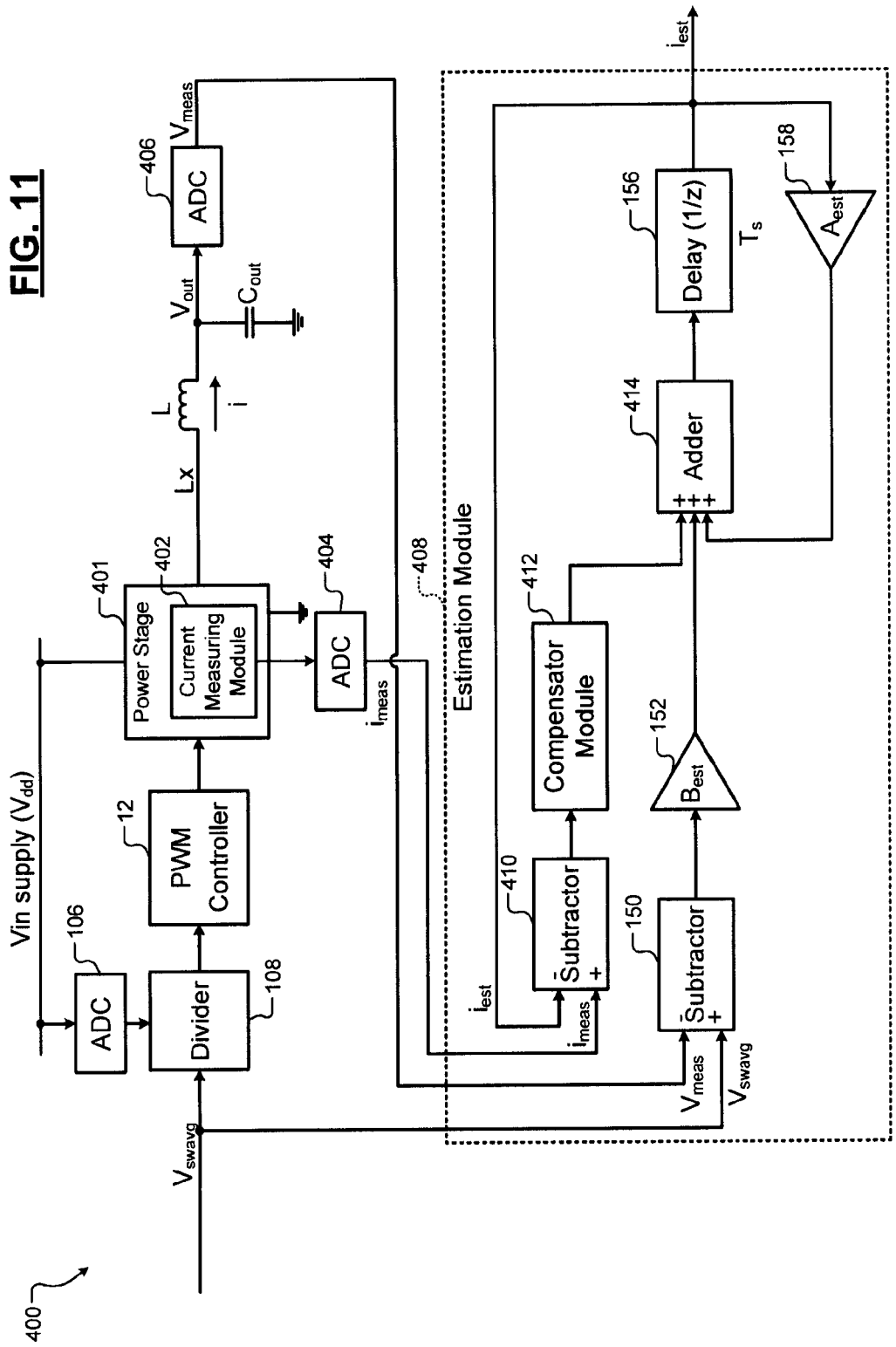
FIG. 11 is a functional block diagram of a system for estimating an inductor current according to the present disclosure.

Referring now to FIG. 11, a system 400 for estimating inductor current is shown. The system 400 estimates the inductor current based on an internal model of the inductor current that is corrected by measurements. Specifically, the model used to estimate the inductor current $i_{est}$ is adjusted by measuring the inductor current and by compensating the delay introduced in measuring the inductor current as described below.

The system 400 includes the ADC 106, the divider 108, the PWM controller 12, a power stage 401 including a current measuring module 402, an ADC 404, the inductor L, the capacitor $C_{out}$, an ADC 406, and an estimation module 408. The system 400 estimates the inductor current as follows. Elements shown and described in prior figures are not described again to avoid repetition.

The power stage 401 drives the inductor L in the output stage of the converter based on the output of the PWM controller 12. The current measuring module 402 measures current through the inductor L. The ADC 404 converts the measured inductor current from analog to digital format ($i_{meas}$). The ADC 406 converts an output voltage at the capacitor $C_{out}$ from analog to digital format and provides a measured output voltage ($V_{meas}$).

The estimation module 408 includes a subtractor 410, a compensator module 412, the subtractor 150, the multiplier 152, an adder 414, and the delay 156. The estimation module 408 estimates the inductor current $i_{est}$ using a mathematical model similar to the mathematical model described above (see description related to the estimation module 104 above). The estimation module 408 adjusts the model based on the measured inductor current $i_{meas}$, the measured output voltage $V_{meas}$, and the average switching voltage $V_{avgsw}$ as described below.

The subtractor 410 generates a difference between the measured inductor current $i_{meas}$ and the estimated inductor current $i_{est}$ fed back to the subtractor 410 from the output of the estimation module 408. The compensator module 412 receives an output of the subtractor 410. The compensator module 412 compensates the output of the subtractor 410 for delays introduced during measurement and conversion of the measure inductor current $i_{meas}$. The compensator module 412 adjusts (i.e., corrects) the model used by the estimation module 408 to estimate the inductor current $i_{est}$ based on the measured inductor current $i_{meas}$. The model is further adjusted based on the measured output voltage $V_{meas}$ as follows.

The subtractor 150 generates a difference between the average switching voltage $V_{avgsw}$ and the measured output voltage $V_{meas}$. The multiplier 152 multiplies the output of the subtractor 150. The adder 154 adds an output of the compensator module 412, the output of the multiplier 152, and an output of the multiplier 158. The delay stage 156 delays an output of the adder 154. The multiplier 158 multiplies the output of the delay stage 156. The output of the delay stage 156 is the estimated inductor current $i_{est}$, which is fed back to the adder 414 via the multiplier 158 and to the subtractor 410 as shown. Accordingly, the model used by the estimation module 408 to estimate the inductor current $i_{est}$ is adjusted by measuring the inductor current, by compensating the delay introduced in measuring the inductor current, and by measuring a difference between the average switching voltage $V_{avgsw}$ and the measured output voltage $V_{meas}$.

Figure 12:
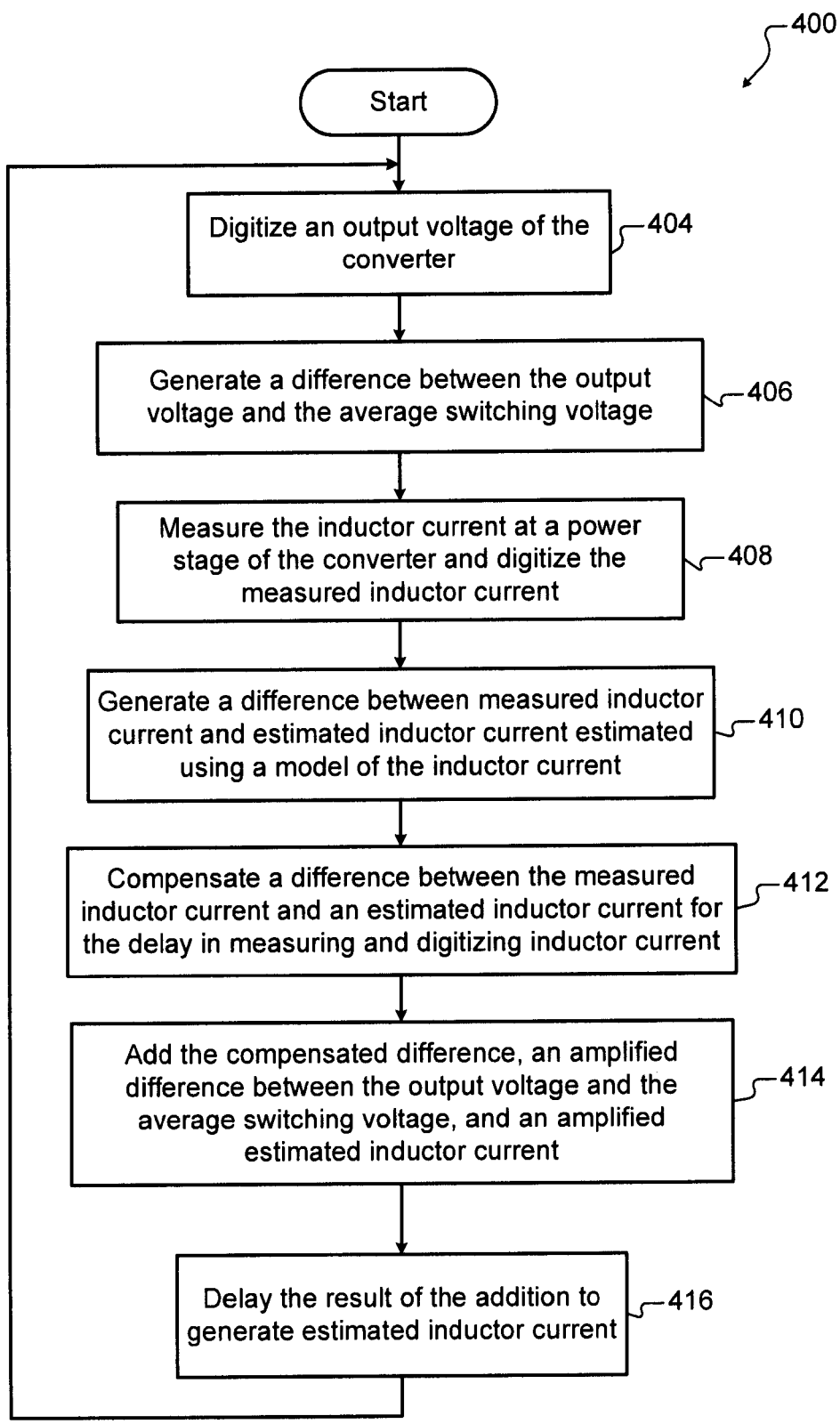
FIG. 12 is a flowchart of a method for estimating an inductor current according to the present disclosure.

Referring now to FIG. 12, a method 500 for estimating the inductor current using a model that is adjusted based on current and voltage measurements is shown. At 504, control digitizes the output voltage of the converter and generates the measured output voltage $V_{meas}$. At 506, control generates a difference between the measured output voltage $V_{meas}$ and the average switching voltage $V_{avgsw}$. At 508, control measures the inductor current at the power stage of the converter and digitizes the measured inductor current to generate the measured inductor current $i_{meas}$. At 510, control generates a difference between the measured inductor current $i_{meas}$ and the estimated inductor current $i_{est}$ estimated using a mathematical model of the inductor current.

At 512, control compensates the difference between the measured inductor current $i_{meas}$ and the estimated inductor current $i_{est}$ for the delay in measuring, computing, and digitizing the measure inductor current $i_{meas}$. At 514, control adds the compensated difference, an amplified difference between measured output voltage $V_{meas}$ and the average switching voltage $V_{avgsw}$, and an amplified estimated inductor current $i_{est}$. At 516, control delays the result of the addition to generate the estimated inductor current $i_{est}$. Accordingly, the model used to estimate the inductor current $i_{est}$ is adjusted by measuring the inductor current and by compensating the delay introduced in measuring the inductor current.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
an estimation module that estimates current through an inductor in an output stage of a power supply using a model of the current and that generates an estimated current; and
a current measuring module that measures the current through the inductor and that generates a measured current,
wherein the estimation module adjusts the model based on the measured current, and
wherein the estimation module comprises
a first subtractor that generates a first difference between the measured current and the estimated current;
a compensator module that compensates the first difference for a time delay in measuring the current through the inductor;
a second subtractor that generates a second difference between an output voltage of the power supply and an average switching voltage used to control switches of the power supply; and
an adder that generates a sum based an output of the compensator module, the second difference, and the estimated current,
wherein the estimation module generates the estimated current based on the sum.

2. The system of claim 1 further comprising a voltage measuring module that measures the output voltage of the power supply and that generates a measured output voltage, wherein the estimation module adjusts the model based on the measured output voltage.

3. The system of claim 1 wherein the estimation module adjusts the model based on the first difference between the measured current and the estimated current.

4. The system of claim 1 further comprising a voltage measuring module that measures the output voltage of the power supply and that generates a measured output voltage, wherein the estimation module adjusts the model based on a difference between the measured output voltage and the average switching voltage used to control switches of the power supply.

5. The system of claim 1 wherein the estimation module estimates the current through the inductor based on the first difference between the measured current and the estimated current.

6. The system of claim 1 wherein the estimation module estimates the current through the inductor based on the second difference between the output voltage of the power supply and the average switching voltage used to control switches of the power supply.

7. A method comprising:
estimating current through an inductor in an output stage of a power supply using a model of the current to generate an estimated current;
measuring the current through the inductor to generate a measured current;
adjusting the model based on the measured current;

generating a first difference between the measured current and the estimated current;

compensating the first difference for a time delay in measuring the current through the inductor;

generating a second difference between an output voltage of the power supply and an average switching voltage used to control switches of the power supply;

generating a sum based the compensated first difference, the second difference, and the estimated current; and generating the estimated current based on the sum.

8. The method of claim 7 further comprising:

measuring the output voltage of the power supply to generate a measured output voltage; and adjusting the model based on the measured output voltage.

9. The method of claim 7 further comprising adjusting the model based on the first difference between the measured current and the estimated current.

10. The method of claim 7 further comprising:

measuring the output voltage of the power supply to generate a measured output voltage; and adjusting the model based on a difference between the measured output voltage and the average switching voltage used to control switches of the power supply.

11. The method of claim 7 further comprising estimating the current through the inductor based on the first difference between the measured current and the estimated current.

12. The method of claim 7 further comprising estimating the current through the inductor based on the second difference between the output voltage of the power supply and the average switching voltage used to control switches of the power supply.

13. The system of claim 1 wherein compensator module compensates the measured current for a measuring delay, wherein the measuring delay includes the time delay in measuring the current through the inductor, and wherein the estimation module adjusts the model based on the measured current that is compensated for the measuring delay.

14. The method of claim 7 further comprising:

compensating the measured current for a measuring delay, wherein the measuring delay includes the time delay in measuring the current through the inductor; and adjusting the model based on the measured current that is compensated for the measuring delay.

* * * * *

UNITED STATES PATENT AND TRADEMARK OFFICE
CERTIFICATE OF CORRECTION

PATENT NO. : 8,829,879 B2  
APPLICATION NO. : 13/447742  
DATED : September 9, 2014  
INVENTOR(S) : Paul Walker Latham, II et al.

Page 1 of 1

It is certified that error appears in the above-identified patent and that said Letters Patent is hereby corrected as shown below:

On the Title Page:  
Item [54] and in the  
Specification, Column 1, Line 3,     After "CONVERTERS¶", insert --FIELD--

In the Specification:  
Column 1, Line 13     After "BACKGROUND¶", delete "Field"  
Column 9, Line 8      Delete "(n),and" and insert --(n), and--

In the Claims:  
Column 12, Line 32, Claim 1     Delete "an" and insert --on--  
Column 13, Line 8, Claim 7      After "based", insert --on--

Signed and Sealed this  
Third Day of February, 2015

Michelle K. Lee  
*Deputy Director of the United States Patent and Trademark Office*